US011939042B2

(12) United States Patent
Wang et al.

(10) Patent No.: US 11,939,042 B2
(45) Date of Patent: Mar. 26, 2024

(54) CONTROL SURFACE ACTUATION SYNCHRONIZATION SYSTEM

(71) Applicant: Eaton Intelligent Power Limited, Dublin (IE)

(72) Inventors: Meng Wang, Eden Prairie, MN (US); Ryan Madson, Dassel, MN (US); Jalpa Shah, Woodbury, MN (US)

(73) Assignee: Eaton Intelligent Power Limited, Dublin (IE)

( * ) Notice: Subject to any disclaimer, the term of this patent is extended or adjusted under 35 U.S.C. 154(b) by 248 days.

(21) Appl. No.: 17/469,611

(22) Filed: Sep. 8, 2021

(65) Prior Publication Data
US 2022/0073192 A1   Mar. 10, 2022

Related U.S. Application Data

(60) Provisional application No. 63/076,033, filed on Sep. 9, 2020.

(51) Int. Cl.
*B64C 13/00* (2006.01)
*B64C 9/28* (2006.01)
*B64C 13/16* (2006.01)
*B64C 13/50* (2006.01)

(52) U.S. Cl.
CPC .............. *B64C 13/503* (2013.01); *B64C 9/28* (2013.01); *B64C 13/16* (2013.01)

(58) Field of Classification Search
CPC ......... B64C 13/503; B64C 9/28; B64C 13/16; B64C 13/50; B64D 2045/001
See application file for complete search history.

(56) References Cited

U.S. PATENT DOCUMENTS

| 3,640,150 A | 2/1972 | Leiner et al. |
| 4,162,438 A | 7/1979 | Osder |
| 4,228,386 A | 10/1980 | Griffith |

(Continued)

FOREIGN PATENT DOCUMENTS

| CN | 104527970 B | 1/2014 |
| EP | 2345579 A2 | 7/2011 |

(Continued)

OTHER PUBLICATIONS

Pulse Width Modulation (Year: NA).*

(Continued)

*Primary Examiner* — Ian Jen
(74) *Attorney, Agent, or Firm* — Merchant & Gould P.C.

(57) ABSTRACT

An actuator control system can include a plurality of electro-mechanical actuators for operating one or more end effectors, a plurality of position sensors associated with the plurality of electro-mechanical actuators, each of the plurality of positions sensors providing an output indicating an actual position value, and a control system. The control system can be configured to receive an activation command signal and the position sensor outputs, and send a speed command for each of the plurality of electro-mechanical actuators and adjust the speed command of each of the plurality of electro-mechanical actuators using a mean position value based on the actual position values to synchronize movement of the plurality of electro-mechanical actuators together.

19 Claims, 5 Drawing Sheets

(56) References Cited

U.S. PATENT DOCUMENTS

| | | | |
|---|---|---|---|
| 4,441,675 A | 4/1984 | Boehringer et al. |
| 4,579,201 A | 4/1986 | Tiedeman |
| 4,800,798 A | 1/1989 | Boldrin et al. |
| 5,493,497 A | 2/1996 | Buus |
| 5,957,798 A | 9/1999 | Smith, III et al. |
| 6,580,234 B2 | 6/2003 | Capewell |
| 6,705,570 B1 | 3/2004 | Degenholtz et al. |
| 6,739,550 B2 | 5/2004 | Koizumi |
| 7,048,234 B2 | 5/2006 | Recksiek et al. |
| 7,464,896 B2 | 12/2008 | Carl et al. |
| 7,549,605 B2 | 6/2009 | Hanlon et al. |
| 7,556,224 B2 | 7/2009 | Johnson et al. |
| 8,600,583 B2 | 12/2013 | Fervel et al. |
| 9,114,872 B2 | 8/2015 | Marques et al. |
| 9,764,853 B2 | 9/2017 | Padilla |
| 9,899,940 B2 * | 2/2018 | Fattal | H02P 5/54 |
| 2004/0200928 A1 | 10/2004 | Degenholtz et al. |
| 2009/0206197 A1 | 8/2009 | Degenholtz et al. |
| 2011/0062282 A1 | 3/2011 | Richter et al. |
| 2016/0028332 A1 * | 1/2016 | Fattal | H02P 5/68 |
| | | | 318/625 |
| 2017/0283039 A1 | 10/2017 | McCormick et al. |

FOREIGN PATENT DOCUMENTS

| | | |
|---|---|---|
| EP | 3239043 A1 | 11/2017 |
| FR | 2972175 A1 | 9/2012 |
| WO | 2007002311 A1 | 1/2007 |
| WO | 2012104265 A1 | 8/2012 |
| WO | 2014142928 A1 | 9/2014 |

OTHER PUBLICATIONS

International Search Report and Written Opinion for International Application No. PCT/EP2021/025338, dated Jan. 19, 2022.
International Search Report and Written Opinion for International Application No. PCT/EP2021/025337, dated Jan. 4, 2022.

* cited by examiner

CONTROL SURFACE ACTUATION SYNCHRONIZATION SYSTEM

CROSS-REFERENCE TO RELATED APPLICATION

This application claims the benefit of U.S. Provisional Application Ser. No. 63/076,033, filed Sep. 9, 2020, the disclosure of which is hereby incorporated by reference in its entirety.

TECHNICAL FIELD

The present disclosure generally relates to aircraft control systems and, more particularly, to control systems related to operating control surfaces of an aircraft.

BACKGROUND

Actuators in aircraft secondary control mechanisms have conventionally been hydraulic/mechanical systems. However, recent advances have resulted in the use of electro-mechanical actuators (EMA) instead of hydraulic-based systems. In many instances, the operation of the electro-mechanical actuators should be synchronized such that common control surfaces operated by a plurality of EMA's are not subjected to uneven loading, and such that corresponding control surfaces on each wing are operated at the same time and rate so as to not adversely affect the operation of the aircraft. Although synchronization approaches have been developed, improvements are desired.

SUMMARY

An actuator control system can include a plurality of electro-mechanical actuators for operating one or more end effectors, a plurality of position sensors associated with the plurality of electro-mechanical actuators, each of the plurality of positions sensors providing an output indicating an actual position value, and a control system. The control system can be configured to receive an activation command signal and the position sensor outputs, and send a speed command for each of the plurality of electro-mechanical actuators and adjust the speed command of each of the plurality of electro-mechanical actuators using a mean position value based on the actual position values to synchronize movement of the plurality of electro-mechanical actuators together.

In some examples, the mean position value is a weighted mean value.

In some examples, the plurality of electro-mechanical actuators are linear acting actuators.

In some examples, the control system includes an EMA controller for each electro-mechanical actuator that receives the position sensor output and sends the speed command.

In some examples, the control system includes a synchronization controller that calculates the mean position value and sends a speed command adjustment parameter to each EMA controller.

In some examples, the mean position values are continuously updated.

In some examples, the weighted mean position value utilizes weighting factors to move the weighted mean position value towards slower moving actuators.

In some examples, the weighting factors sum to equal 1.

An actuator control system can include a plurality of electro-mechanical actuators for operating one or more end effectors, a plurality of position sensors associated with the plurality of electro-mechanical actuators and one or more end effectors, and a control system. The control system can be configured to receive an activation command signal, send a speed command to each of the plurality of electro-mechanical actuators, receive outputs of the position sensors and calculate actual position values, calculate a mean position value based on the actual position values, and adjust the speed command for each of the plurality of electro-mechanical actuators such that each of the actual positions values matches the mean position value, thereby synchronizing the actual positions of the plurality of electro-mechanical actuators or end effectors together.

In some examples, the mean position value is a weighted mean value.

In some examples, the plurality of electro-mechanical actuators are linear acting actuators.

In some examples, the control system includes an EMA controller for each electro-mechanical actuator that receives the position sensor output and send the speed command.

In some examples, the control system includes a synchronization controller that calculates the mean position value and sends a speed command adjustment parameter to each EMA controller.

In some examples, the mean position values are continuously updated.

In some examples, the weighted mean position value utilizes weighting factors to move the weighted mean position value towards slower moving actuators.

In some examples, the weighting factors sum to equal 1.

A method for synchronizing a plurality of electro-mechanical actuators can include receiving an actuator position demand, sending a speed command to each of the plurality of electro-mechanical actuators, receiving outputs from positions sensors associated with the plurality of electro-mechanical actuators and calculating actual position values, adjusting the speed command of each of the plurality of electro-mechanical actuators using a comparison between a mean position value and the actual position values to synchronize movement of the plurality of electro-mechanical actuators together.

In some examples, the plurality of electro-mechanical actuators are linear acting actuators.

In some examples, the sending and receiving steps are performed at an EMA controller provided for each electro-mechanical actuator.

In some examples, a synchronization controller calculates the mean value.

In some examples, the synchronization controller sends a speed command adjustment parameter to each EMA controller.

In some examples, mean position value is a weighted mean value.

In some examples, the weighted mean position value utilizes weighting factors to move the weighted mean position value towards slower moving actuators.

In some examples, the weighting factors sum to equal 1.

In some examples, the mean position value is continuously updated.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

DETAILED DESCRIPTION

Figure 1:
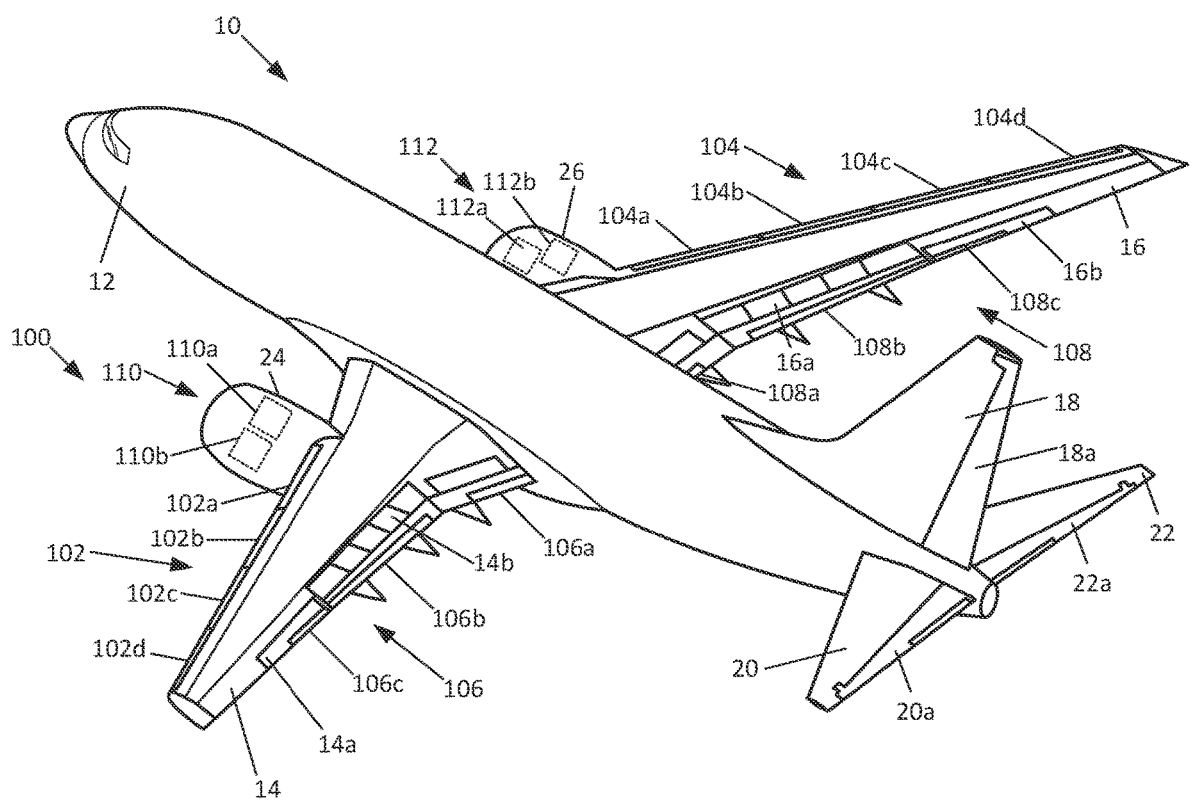
FIG. 1 is a schematic view of an aircraft having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring to FIG. 1, a schematic representation of an example aircraft 10 is presented. In general terms, the aircraft 10 includes a fuselage 12, left and right wings 14, 16, a vertical stabilizer 18, and left and right horizontal stabilizers 20, 22. The aircraft 10 is also provided with a number of primary flight control surfaces for operating the aircraft 10 during flight. Examples of such primary flight control surfaces are ailerons 14a, 16a and spoilers 14b, 16b associated with the left and right wings 14, 16, a rudder 18a associated with the vertical stabilizer 18, and elevators 20a, 22a associated with the left and right horizontal stabilizers 20, 22. The aircraft 10 is also shown as being provided with jet engines 24, 26 respectively associated with the left and right wings 14, 16. The aircraft 10 is also provided with a number of secondary control surfaces 100 which are generally used during take-off and landing procedures. Examples of such secondary control surfaces 100 are slats 102 (102a-102d) and flaps 106 (106a-106c) associated with the left wing 14, slats 104 (104a-104d) and flaps 108 (108a-108c) associated with the right wing 16, and thrust reversers 110 (110a, 110b), 112 (112a, 112b) respectively associated with the left and right engines 24, 26.

In one example use of the secondary control surfaces, the slats 102, 104 and flaps 106, 108 can be extended during takeoff to increase the overall size and lift of the wings 14, 16. In the extended position, the slats 102, 104 and flaps 106, 108 greatly increase the lift generated by the wings 14, 16 which in turn enables the aircraft 10 to take off more capably and under heavier loads. When takeoff is complete and the aircraft 10 enters a cruising phase, the slats 102, 104 and flaps 106, 108 can be retracted to reduce drag on the wings 14, 16 and therefore allow for more efficient operation. The slats 102, 104 and/or flaps 106, 108 can also be used during the landing procedure to reduce the required distance and speed to safely land the aircraft 10. In one aspect, the slats 102, 104 and flaps 106, 108 can be characterized as being high-lift devices.

In another example use of the secondary control surfaces, the thrust reversers 110, 112 can be activated into an extended position to temporarily divert the thrust of the engines 24, 26. By activating the thrust reversers 110, 112, the diverted thrust acts against the forward direction of the aircraft 10 to provide deceleration just after touch-down such that the diverted thrust acts against the forward travel of the aircraft. The incorporation of thrust reversers 110, 112 therefore enables the aircraft 10 to land over a shorter distance and reduces the wear on the brakes of the aircraft 10. In one aspect, the thrust reversers 110, 112 can be characterized as forming part of a thrust reverser actuation system (TRAS).

With operations of the type described above involving secondary control surfaces, for safe operation of the aircraft 10, it is necessary for the actuators controlling the secondary control surfaces associated with the left wing 14 to operate simultaneously with the actuators controlling the counterpart secondary control surfaces associated with the right wing 16 such that undesired forces are not generated on the aircraft 10 which may cause the aircraft to roll and/or yaw in an unexpected and potentially unsafe manner. Additionally, where multiple actuators are used to operate a single secondary control surface, it is also necessary for the actuators to operate simultaneously to avoid imparting unnecessary stresses onto the component defining the secondary control surface.

Although one example of an aircraft 10 is presented with three examples of secondary control surfaces 100 (e.g. slats 102/104, flaps 106/108, thrust reversers 110/112), many other configurations of the aircraft 10 and secondary control surfaces 100 are possible without departing from the concepts presented herein.

Figure 2:
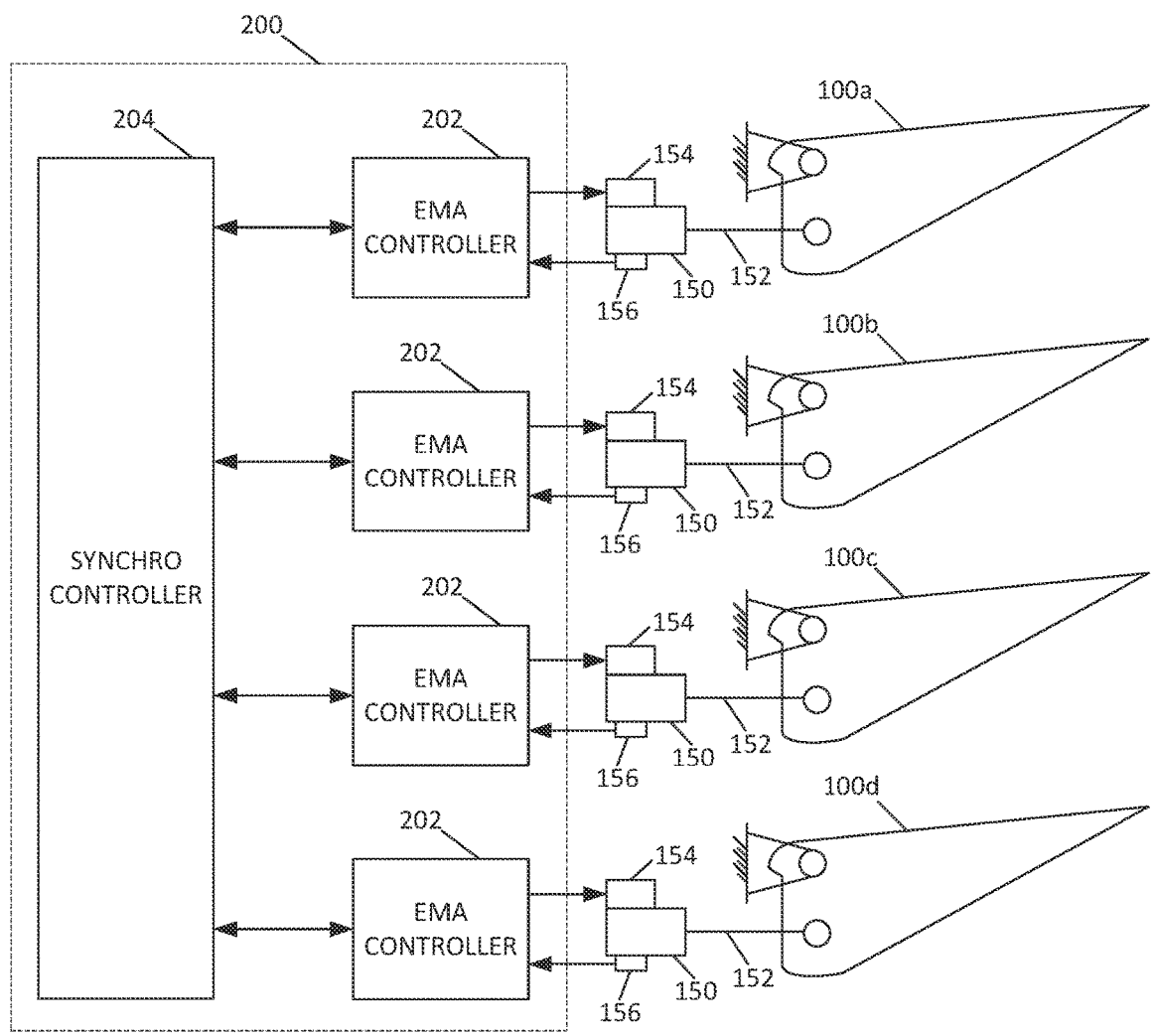
FIG. 2 is a schematic showing an example control surface actuation system of the aircraft shown in FIG. 1.
Figure 3:
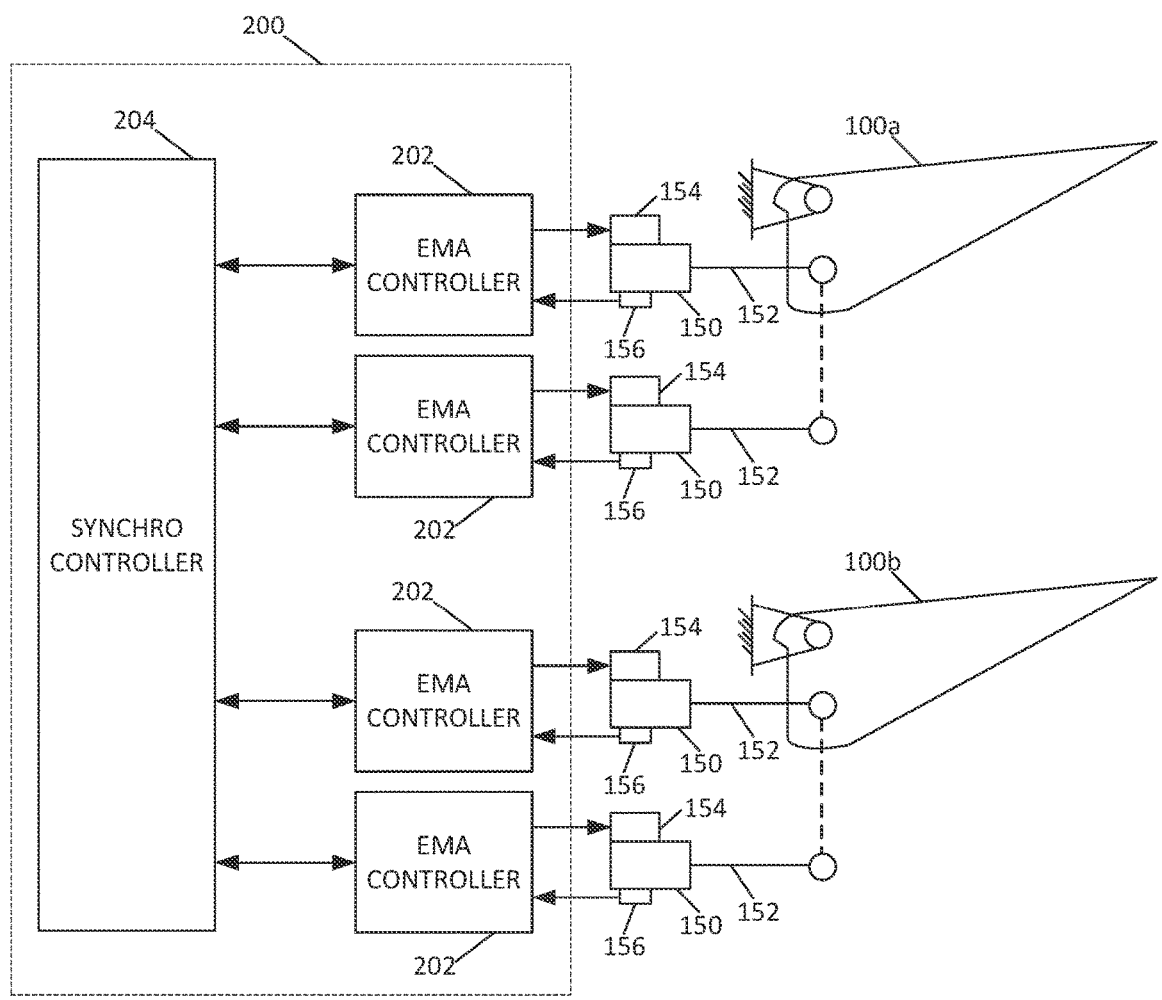
FIG. 3 is a schematic showing an example control surface actuation system of the aircraft shown in FIG. 1.
Figure 4:
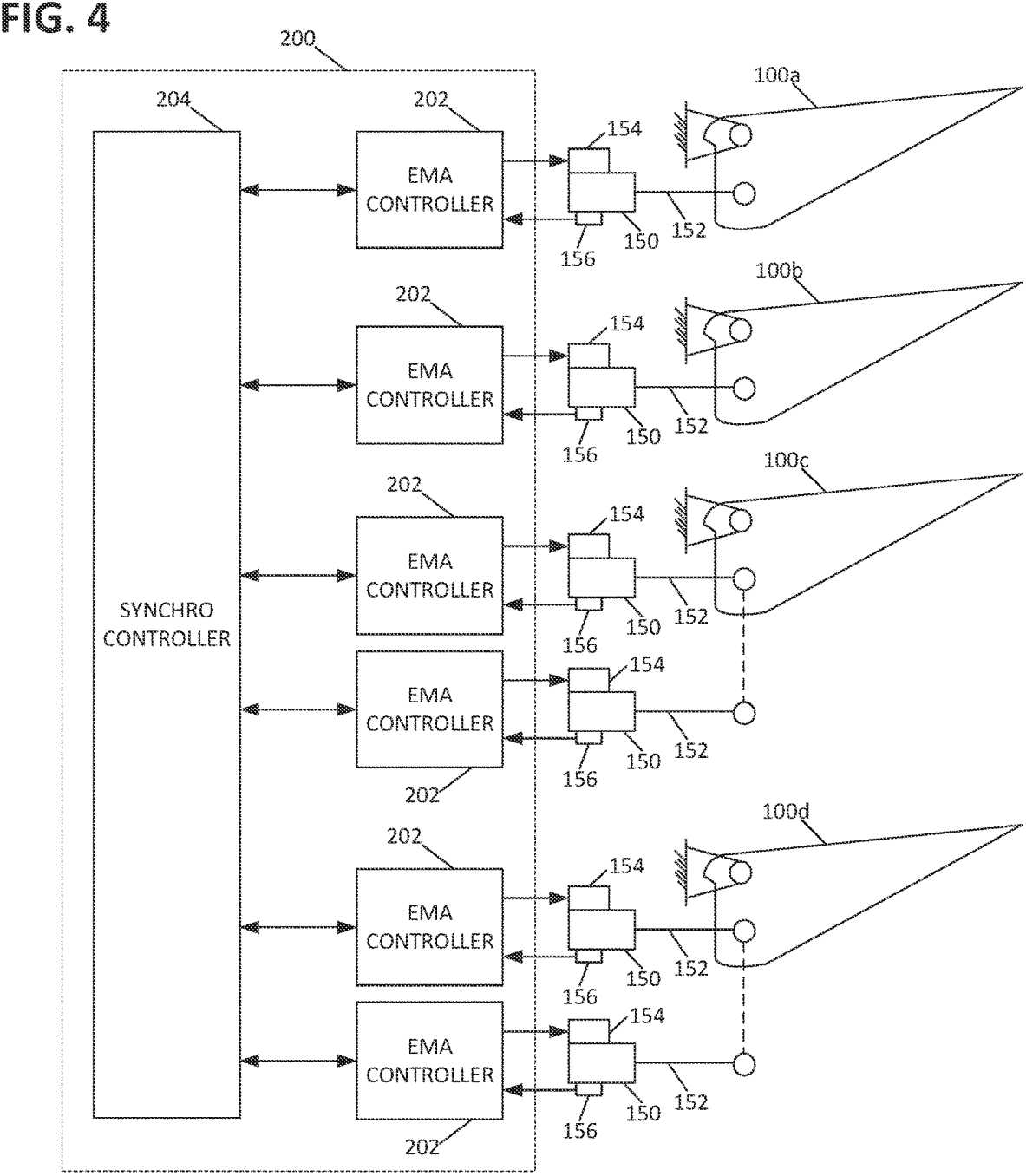
FIG. 4 is a schematic showing an example control surface actuation system of the aircraft shown in FIG. 1.

Referring to FIGS. 2 and 3, schematics are presented showing a control surface actuation system usable to operate control surfaces 100 of the aircraft 10, including but not limited to, the above-described secondary control surfaces 100. As shown at FIG. 2, a plurality of control surfaces 100 (100a-100d) are presented, wherein each of the control surfaces 100 is driven by a single actuator 150. As shown at FIG. 3, a plurality of control surfaces 100 (100a-100b) are presented, wherein each of the control surfaces 100 is driven by a plurality of actuators 150. As shown at FIG. 4, a plurality of control surfaces 100 (100a-100d) are presented, wherein some of the control surfaces 100 (100a, 100b) are driven by a single actuator 150 and some of the control surfaces 100 (100c, 100d) are driven by a plurality of actuators 150. Although FIGS. 3 and 4 show two actuators 150 driving some of the control surfaces 100, more actuators 150 can be provided, for example, three, four, six, eight, or more actuators 150.

In one aspect, the actuators 150 drive the control surfaces 100 by operating a member 152 operably connected to the control surfaces 100. Each actuator 150 is shown as being an electro-mechanical actuator 150 driven by a motor 154. The actuator 150 can be, for example, a linear acting actuator with a linear screw driven by the motor 154. In some examples, the member 152 is operably connected to the actuator 150 via a gear set, such as a planetary gear set. In some examples, the member 152 is a part of the actuator 150, such as a shaft of the actuator 150. The control surfaces 100a-100d of FIG. 2 and the control surfaces 100a-100b of FIG. 3 can correspond to any of the control surfaces 102, 104, 106, 108 shown in FIG. 1. Although four control surfaces 100 are shown at FIG. 2 and two control surfaces 100 are shown at FIG. 3, the actuation systems of FIGS. 2 and 3 can include any number of control surfaces 100 and corresponding actuators 150. For example, an actuation system associated with the aircraft slats 102, 104 would include eight control surfaces (102a-102d, 104a-104d) and at least eight actuators 150. Where each of the control surfaces in such an arrangement are driven by a single actuator 150, the arrangement of FIG. 2 would be applicable. Where multiple actuators 150 are used to drive each control surface, the arrangement of FIG. 2 would be applicable. As mentioned above, an arrangement wherein some of the control surfaces 100 are driven by different numbers of actuators 150 is also possible. For example, an arrangement could exist where the flaps 106a, 106c, 108a, 108c could be driven by a single actuator 150 and the flaps 106b, 108b are driven by multiple actuators 150.

With continued reference to FIGS. 2, 3, and 4, the actuation system can further include control system 200 including one or more programmable controllers, e.g., a processor, microprocessor, and field programmable gate array (FPGA) typical of an avionics control system. In one aspect, the control system 200 includes an EMA controller 202 for controlling each actuator 150. Multiple actuation systems and control systems 200 can be provided in a system. For example, for the example disclosed aircraft 10, an actuation and control system 200 could be provided to operate the slats 102 (102a-102d), 104 (104a-104d), an actuation and control system 200 could be provided to operate the flaps 106 (106a-106c), 108 (108a-108c), and an actuation and control system 200 could be provided to operate the thrust reversers 110 (110a-110b), 112 (112a-112b). In one aspect, each control system 200 is configured to receive a user command signal to position the associated control surfaces 100. The user command signal can be received centrally and distributed to the EMA controllers of the control system 200 or can be received directly at each EMA controller. In some examples, the user command signal can be a signal activated by a pilot of the aircraft 10 via a user interface (e.g., selector knob, switch, GUI, etc.). An automatic command signal can also be provided where the command signal is generated automatically by another part of the control system. A user command signal and an automatic command signal can be generically referred to as an activation command signal.

Each EMA controller 202 is configured to send a speed command signal to the motor 154 and to receive an output from a position sensor 156 associated with the actuator 150. As the actuator 150 is mechanically coupled to the control surface 100, a simple calculation can be used to translate the output of each of the position sensors 156 to the angular position of the control surface 100. This position can be used as a reference point for further action, for example, deactivating the actuator 150 once a predetermined angle or position has been reached. Other reference points based on the position sensor outputs can be used as well for certain calculations, for example the position of the actuator 150.

As mentioned previously, it is advantageous to synchronize the movement of control surfaces 100 to every extent possible. Thus, the outputs of the EMA controllers 202 should be coordinated to accomplish this objective. In one aspect, even after receiving the same speed command signal, actuators 150 can move more quickly or slowly relative to each other, either due to uneven external forces on the control surfaces 100, or other internal or external forces. Accordingly, the output of one EMA controller 202 may need to be different from another EMA controller 202 in order to achieve the desired end result of the corresponding control surfaces moving simultaneously in a synchronized fashion. To accomplish this synchronization objective, the control system 200 is provided with a synchronization controller 204 communicating with each of the EMA controllers 202. In one aspect, the synchronization controller 204 receives an actual position value from each EMA controller 202. From the actual position values received from the EMA controllers 202, the synchronization controller 204 generates a common reference parameter that is continuously updated in real time. In one example, the common reference parameter is a mean value of the actual position values. In one example, the common reference parameter is a weighted mean value of the actual position values. In one example, the common reference parameter is calculated, as follows:

$$\sum_{i=1}^{n} \rho_n = 1 \quad \bar{\theta} = \frac{\text{Speed } cmd = PID(\bar{\theta} - \theta_n)}{\rho_1 \theta_{fast} + \rho_2 \theta_2 + \ldots + \rho_n \theta_{slow}}$$

$\theta$: EMA position, $\rho$: weighting factor

Formula 1

With such a calculation, $\theta$ represents the actual position values while $\rho$ represents the weighting factors applied to each of the actual actuator positions. In one example, the weighting factors $\rho$ are updated or adjusted in real time. In one example, the weighting factors $\rho$ can be customized to set the mean position closer to the slower actuators 150, which are the actuators under heavier loads. Such an approach accommodates control bandwidth limitations and the force/torque limitations of the more loaded actuators 150. In the example shown, the sum of the weighting factors $\rho$ is equal to one.

Once the weighted mean position value or common reference parameter is calculated, the synchronization controller 204 can then perform a comparison between each of the actual positions values and the weighted mean values. In one example, the comparison includes calculating an angle error value for each actuator 150. Based on these comparisons, the synchronization controller 204 provides an output to each EMA controller 202 to adjust the speed command to the actuator 150 to match the weighted mean value, thereby minimizing the position difference or angle error value to the extent possible. In an illustrative example, an actuation and control system can include three EMA controllers 202, wherein the initial speed command signal is 8,000 rpm, wherein the synchronization controller 204 increases the speed command signal for one EMA controller 202 to 8,100, decreases the speed command signal for another EMA controller 202 to 7,900, and does not change the speed command signal for the third EMA controller in order to achieve synchronized movement of the associated control surfaces 100.

In one example, the speed command signal is adjusted to ensure that a maximum angle error value is not exceeded. By synchronizing each of the EMA controllers 202 to the weighted mean value, the EMA controllers 202 are synchronized together as a result. Where the control surface 100 is used as the common reference component for the position values, a maximum angle error value can be chosen that is equal to one half of the acceptable angle error between any two control surfaces controlled by the EMA controllers 202. Using such an approach, the maximum angle error between any two control surfaces will necessarily fall within the acceptable angle error as two values less than or equal to one half will always sum to be one or less.

Figure 5:
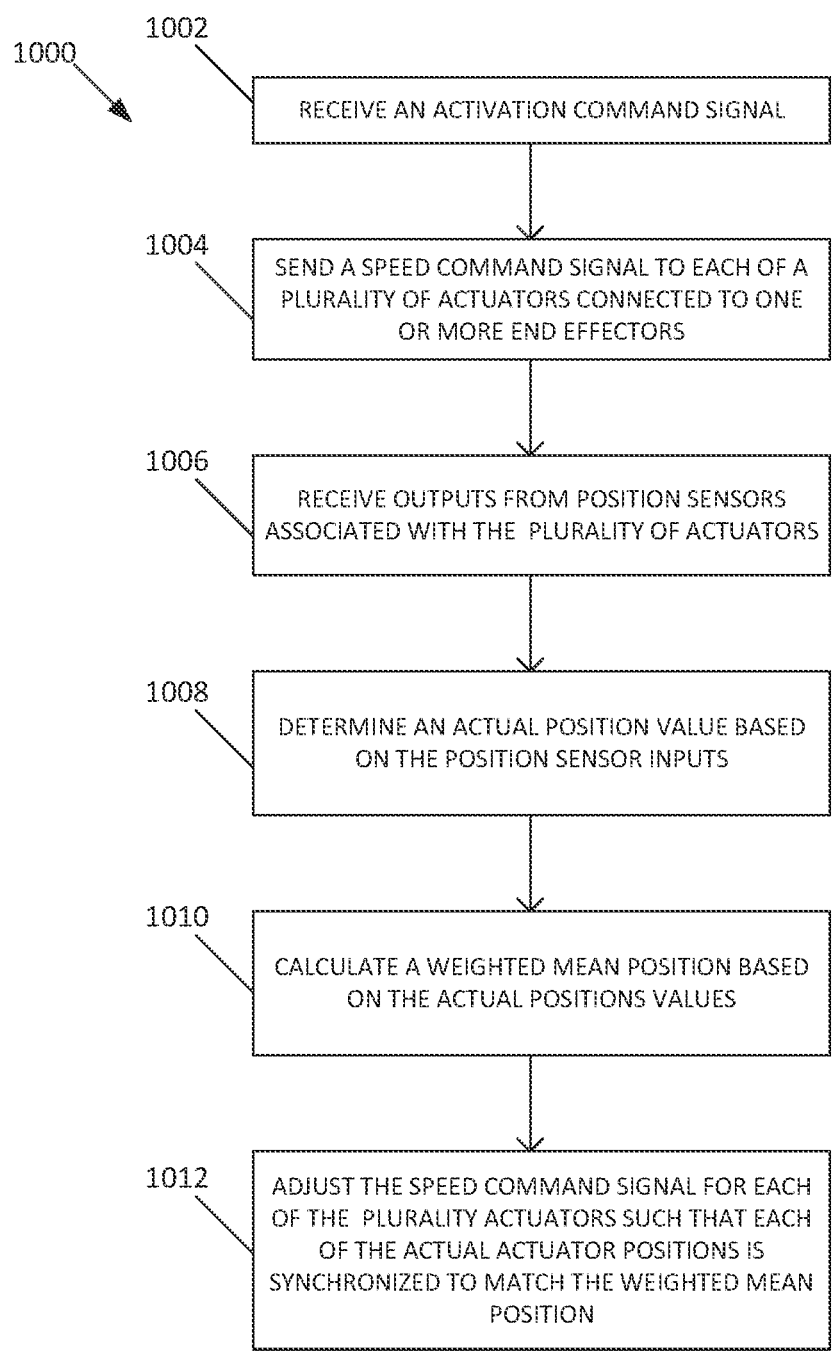
FIG. 5 is a process flow chart showing an example operation of the control surface actuation system shown in FIGS. 2 to 4.

Referring to FIG. 5, an example operation 1000 of the control system 200, including the EMA controllers 202, and the synchronization controller 204 is presented. In an initial step 1002, the control system 200 receives a user command signal relating to a group of end effectors, for example secondary control surfaces 100. Other types of end effectors are also possible, for example, primary flight control surfaces or any other type of mechanical components for which synchronized movement is desired. As related above, the user command signal can be generated by the pilot of the aircraft. However, step 1002 can alternatively include an automatically generated command signal received from another control system of the aircraft 10. In response to the user command signal, each of the EMA controllers 202 sends a speed command signal to the associated actuator 150 to move the control surface 100 to a desired position at a step 1004. The EMA controllers 202 receive outputs from the position sensors 156 associated with the actuators 150 at a step 1006 and, based on the position sensor outputs, determine an actual position value at a step 1008. In a step 1010, a weighted mean position based on the actual position values is calculated at the synchronization controller. In a step 1012, the speed command for each of the actuators 150 is adjusted such that the actual position value is synchronized to match the weighted mean position value, for example such that the difference between the actual and weighted mean position values fall within a predefined maximum angle error value.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. An actuator control system comprising:
    (a) a plurality of electro-mechanical actuators for operating one or more end effectors;
    (b) a plurality of position sensors associated with the plurality of electro-mechanical actuators, each of the plurality of position sensors providing an output indicating an actual position value; and
    (c) a control system comprising:
        (i) a plurality of EMA controllers, wherein each of the plurality of EMA controllers is associated with a corresponding electro-mechanical actuator, each of the plurality of EMA controllers receiving the actual position value of the one or more end effectors,
        (ii) a synchronization controller, wherein the synchronization controller receives the actual position value from each of the EMA controllers and calculates a mean position value,
        (iii) wherein the synchronization controller compares the actual position value of each of the one or more end effectors to the mean position value, the synchronization controller sending an output to each of the plurality of EMA controllers to adjust a speed command of the plurality of electro-mechanical actuators to match the mean position value.

2. The actuator control system of claim 1, wherein the mean position value is a weighted mean value.

3. The actuator control system of claim 1, wherein the plurality of electro-mechanical actuators are linear acting.

4. The actuator control system of claim 1, wherein adjusting the speed command of the electro-mechanical actuators synchronizes the movement of the plurality of electro-mechanical actuators together.

5. The actuator control system of claim 1, wherein the mean position value is continuously updated.

6. The actuator control system of claim 2, wherein the weighted mean position value utilizes weighting factors to move the weighted mean value towards slower moving actuators.

7. The actuator control system of claim 6, wherein the weighting factors sum to equal 1.

8. An actuator control system comprising:
    (a) a plurality of electro-mechanical actuators for operating one or more end effectors;
    (b) a plurality of position sensors associated with the plurality of electro-mechanical actuators and one or more end effectors; and
    (c) a control system configured to:
        (i) receive an activation command signal;
        (ii) send a speed command to each of the plurality of electro-mechanical actuators;
        (iii) receive outputs of the position sensors and calculate actual position values;
        (iv) calculate a mean position value based on the actual position values; and
        (v) adjust the speed command for each of the plurality of electro-mechanical actuators such that each of the actual position values matches the mean position value, thereby synchronizing the actual positions of the plurality of electro-mechanical actuators or end effectors together.

9. The actuator control system of claim 8, wherein the mean position value is a weighted mean value.

10. The actuator control system of claim 8, wherein the plurality of electro-mechanical actuators are linear acting actuators.

11. The actuator control system of claim 8, wherein the control system includes an EMA controller for each electro-mechanical actuator that receives the position sensor output and sends the speed command.

12. The actuator control system of claim 11, wherein the control system includes a synchronization controller that calculates the mean position value and sends a speed command adjustment parameter to each EMA controller.

13. The actuator control system of claim 8, wherein the mean position value is continuously updated.

14. The actuator control system of claim 9, wherein the weighted mean position value utilizes weighting factors to move the weighted mean value towards slower moving actuators.

15. The actuator control system of claim 14, wherein the weighting factors sum to equal 1.

16. A method for synchronizing a plurality of electro-mechanical actuators, the method comprising the steps of:
    (a) receiving an actuator position demand;
    (b) sending a speed command to each of the plurality of electro-mechanical actuators;
    (c) receiving outputs from position sensors associated with the plurality of electro-mechanical actuators and calculating actual position values;
    (d) adjusting the speed command of each of the plurality of electro-mechanical actuators using a comparison between a mean position value and the actual position values to synchronize movement of the plurality of electro-mechanical actuators together.

17. The method of claim 16, wherein the sending and receiving steps are performed at an EMA controller provided for each electro-mechanical actuator.

18. The method of claim 17, wherein a synchronization controller calculates the mean position value and sends a speed command adjustment parameter to each EMA controller.

19. The method of claim 16, wherein the mean position value is a weighted mean value, wherein the weighted mean value utilizes weighting factors to move the weighted mean value towards slower moving actuators.

* * * * *